United States Patent
Li

(10) Patent No.: US 10,049,498 B2
(45) Date of Patent: Aug. 14, 2018

(54) VIDEO CONVERSION METHOD, APPARATUS AND SYSTEM

(71) Applicant: Beijing Pico Technology Co., Ltd., Beijing (CN)

(72) Inventor: Ligang Li, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 15/211,801

(22) Filed: Jul. 15, 2016

(65) Prior Publication Data

US 2017/0169615 A1 Jun. 15, 2017

(30) Foreign Application Priority Data

Dec. 9, 2015 (CN) .......................... 2015 1 0908470

(51) Int. Cl.
- *G06T 19/00* (2011.01)
- *H04N 21/436* (2011.01)
- *H04N 21/4363* (2011.01)
- *H04N 21/4402* (2011.01)

(52) U.S. Cl.
CPC ..... *G06T 19/006* (2013.01); *H04N 21/43615* (2013.01); *H04N 21/43635* (2013.01); *H04N 21/43637* (2013.01); *H04N 21/4402* (2013.01)

(58) Field of Classification Search
CPC ................................ H04N 13/0029
USPC ........................................... 348/43
See application file for complete search history.

(56) References Cited

U.S. PATENT DOCUMENTS

| 5,812,204 A | * | 9/1998 | Baker | G09G 5/39 348/441 |
| 5,838,389 A | * | 11/1998 | Mical | G09G 5/06 345/602 |
| 6,052,506 A | * | 4/2000 | Fukushima | H04N 5/775 348/734 |
| 6,538,675 B2 | * | 3/2003 | Aratani | G06F 3/038 345/157 |
| 8,624,936 B2 | * | 1/2014 | Kimura | G09G 3/3666 345/690 |
| 2002/0186212 A1 | * | 12/2002 | Matsumoto | G06F 3/14 345/204 |

(Continued)

*Primary Examiner* — Paulos M Natnael
(74) *Attorney, Agent, or Firm* — Harness, Dickey & Pierce, P.L.C.

(57) ABSTRACT

The present disclosure discloses a video conversion method, apparatus and system. The apparatus comprises: a video input controller, a main controller, and a video output controller; the video input controller is configured to establish a data connection with a video source; the video output controller is configured to establish a data connection with an intelligent terminal; and the main controller is configured to control the video input controller to acquire a video stream transmitted from the video source; control the video input controller to perform a format conversion operation on the video stream in a preset video display format; and control the video output controller to output a converted video stream to the intelligent terminal which displays the converted video stream. The technical solutions provided by the present disclosure can solve the problem that the existed intelligent terminal such as a cellular phone cannot run the virtual reality applications well due to the restricted performance.

10 Claims, 2 Drawing Sheets

(56) References Cited

U.S. PATENT DOCUMENTS

| | | | |
|---|---|---|---|
| 2003/0020757 A1* | 1/2003 | Aratani | G06F 3/038 |
| | | | 715/790 |
| 2013/0021438 A1* | 1/2013 | Tucker | H04N 13/0048 |
| | | | 348/43 |
| 2013/0106996 A1* | 5/2013 | Tsai | H04N 13/0029 |
| | | | 348/43 |
| 2017/0280166 A1* | 9/2017 | Walkingshaw | H04N 19/86 |

* cited by examiner

VIDEO CONVERSION METHOD, APPARATUS AND SYSTEM

CROSS-REFERENCE TO RELATED APPLICATION

This application claims the benefit and priority of Chinese Application No. 201510908470.2 filed Dec. 9, 2015. The entire disclosure of the above application is incorporated herein by reference.

FIELD

The present disclosure relates to the technical field of video conversion, and particularly, to a video conversion method, apparatus and system.

BACKGROUND

This section provides background information related to the present disclosure which is not necessarily prior art.

In recent years, following the gradual maturity of the virtual reality technique, people's requirement of the virtual reality device is increasingly higher.

Along with the successive occurrence of various virtual reality devices, the virtual reality device represented by the Cardboard takes a cellular phone as the main part, and an ordinary cellular phone can be changed into a virtual reality device just by using a support composed of two lenses and some cheap materials, which greatly reduces the cost of the virtual reality device. However, due to the limitations of volume and power consumption of the cellular phone, the platform performance cannot meet the requirement of a high-quality virtual reality (VR) scene, and even a cellular phone of the best performance can only run some VR applications having very simple scenes, which largely restricts the usage range of the virtual reality device based on the cellular phone.

In conclusion, there is a problem that the existed intelligent terminal such as a cellular phone cannot well run the virtual reality applications due to the restricted performance.

SUMMARY

This section provides a general summary of the disclosure, and is not a comprehensive disclosure of its full scope or all of its features.

The present disclosure provides a video conversion method, apparatus and system. The technical solutions provided by the present disclosure can solve the problem that the existed intelligent terminal such as a cellular phone cannot well run the virtual reality applications due to the restricted performance.

According to one aspect of the present disclosure, a video conversion apparatus is provided, comprising a video input controller, a main controller, and a video output controller;

the video input controller is configured to establish a data connection with a video source;

the video output controller is configured to establish a data connection with an intelligent terminal; and the main controller is configured to control the video input controller to acquire a video stream transmitted from the video source; control the video input controller to perform a format conversion operation on the video stream in a preset video display format; and control the video output controller to output a converted video stream to the intelligent terminal which displays the converted video stream.

According to another aspect of the present disclosure, a video conversion system is provided, comprising a video source, an intelligent terminal, and the video conversion apparatus according to any one of the above items;

a video input end of the video conversion apparatus establishes a data connection with the video source;

a video output end of the video conversion apparatus establishes a data connection with the intelligent terminal;

the video conversion apparatus is configured to acquire a video stream transmitted from the video source, perform a format conversion operation on the video stream in a preset video display format, and output a converted video stream to the intelligent terminal which displays the converted video stream.

According to a further aspect of the present disclosure, a video conversion method is provided, comprising:

establishing a data connection with a video source, and establishing a data connection with an intelligent terminal;

acquiring a video stream transmitted from the video source, and performing a format conversion operation on the video stream in a preset video display format; and outputting a converted video stream to the intelligent terminal which displays the converted video stream.

Further, the video source comprises a terminal device for running a virtual reality (VR) application;

establishing a data connection with the video source comprises: establishing a wired connection with the video source, or establishing a wireless connection with the video source;

establishing a wired connection with the video source comprises:

establishing a wired connection with the video source through a High Definition Multimedia Interface (HDMI) data line, or a Video Graphics Array (VGA) data line, or a Digital Visual Interface (DVI) database, or a DisplayPort data line, or a Mobile High-Definition Link (MHL) video line;

or, establishing a wireless connection with the video source comprises:

establishing a wireless connection with the video source through a Wireless Home Digital Interface (WHDI) wireless connection mode, or a Wireless Gigabit (WiGig) wireless connection mode, or a Wireless Display (WIDI) wireless connection mode.

Further, acquiring a video stream transmitted from the video source, and performing a format conversion operation on the video stream in a preset video display format comprises:

After establishing a data connection with the video source, acquiring a video stream transmitted from the video source, and performing a format conversion operation on the video stream in a video display format corresponding to the data connection mode.

Further, establishing a data connection with an intelligent terminal comprises: establishing a data connection with the intelligent terminal through a video output controller supporting a USB Video Class (UVC);

Displaying the converted video stream by the intelligent terminal comprises:

Extracting the converted video stream from the buffer, and transmitting the converted video stream to the intelligent terminal according to the UVC.

Further, after performing a format conversion operation on the video stream in a preset video display format, the method comprises: storing the converted video stream in the buffer, and outputting the converted video stream in the buffer to the intelligent terminal which displays the converted video stream.

In conclusion, the technical solutions provided by the present disclosure acquire a video stream transmitted from the video source, and perform a format conversion operation on the video stream in a preset video display format; output the converted video stream to the intelligent terminal which displays the converted video stream. That is, a high-quality virtual reality application is run as a video source by a high-performance terminal device, while the intelligent terminal is only responsible for displaying. Thus the user can experience a high-quality virtual reality application on the intelligent terminal like a cellular phone without buying expensive equipment such as the virtual reality helmet, when a virtual reality application is to be displayed on the intelligent terminal, thereby solving the problem that the existed intelligent terminal does not have the performance of running a high-quality virtual reality application due to the limitations of volume and power consumption.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
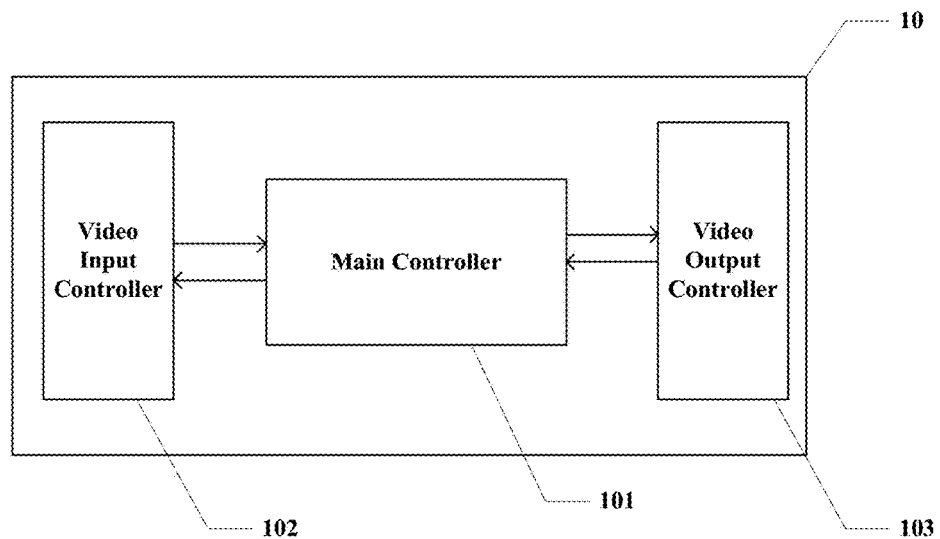
FIG. 1 is a structure diagram of a video conversion apparatus in the present disclosure.

FIG. 1 is a structure diagram of a video conversion apparatus in the present disclosure. As illustrated in FIG. 1, the apparatus comprises: a video input controller 102, a main controller 101, and a video output controller 103, wherein the video input controller 102 is configured to establish a data connection with a video source 20, and the video output controller 103 is configured to establish a data connection with an intelligent terminal 30.

After the data connection is successfully established, the main controller 101 controls the video input controller 102 to acquire a video stream transmitted from the video source; controls the video input controller 102 to perform a format conversion operation on the acquired video stream in a preset video display format to obtain a converted video stream; and controls the video output controller 103 to output the converted video stream to the intelligent terminal which displays the converted video stream.

It can be seen that in the present disclosure, a high-performance terminal device runs a high-quality virtual reality application as the video source, so that the intelligent terminal is only responsible for displaying, thus the virtual reality application can be displayed on the intelligent terminal without buying any expensive equipment such as a virtual reality helmet, which not only utilizes the existed intelligent terminal device at a larger extent, but also avoids the investment on expensive equipment bought for displaying the virtual reality application. Thus the video conversion apparatus provided by the present disclosure solves the problem that the existed intelligent terminal does not have the performance of well running a high-quality virtual reality application due to the limitations of volume and power consumption.

In order to obtain a better virtual reality display effect, and be adaptive to different models of different manufacturers and intelligent terminal devices of different performances, in a preferred embodiment of the present disclosure, the video conversion apparatus further comprises a buffer for buffering the video stream received from the video source.

Figure 2:
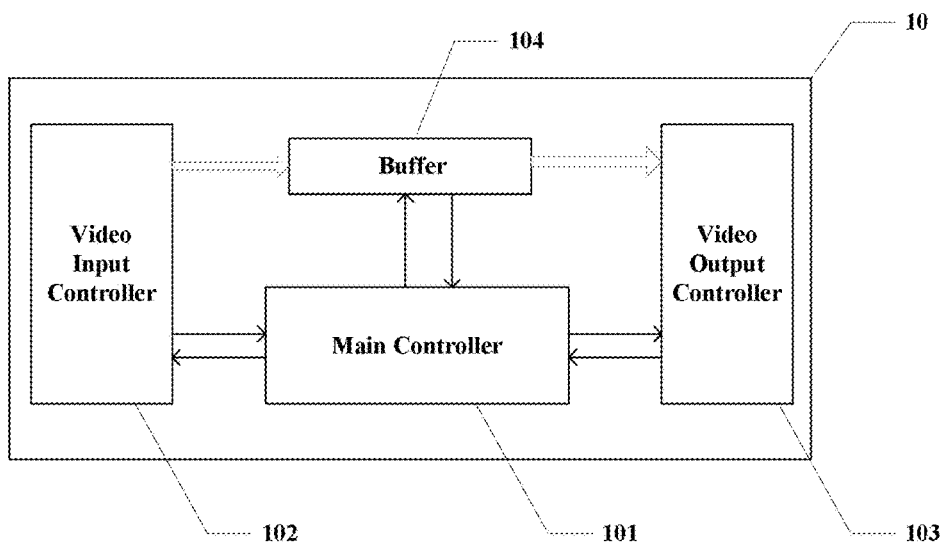
FIG. 2 is a detailed structure diagram of a video conversion apparatus in the present disclosure.
Figure 3:
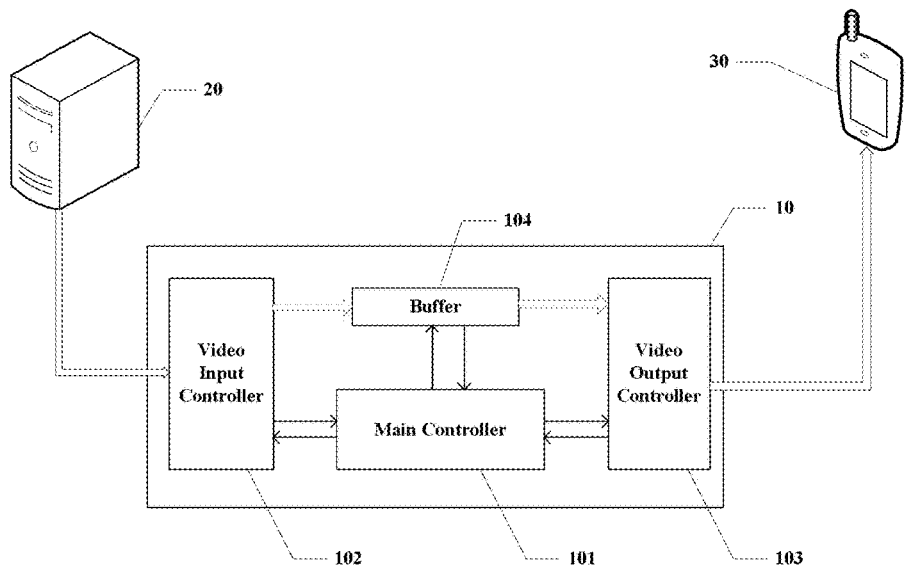
FIG. 3 is a structure diagram of a video conversion system in the present disclosure.

FIG. 2 is a detailed structure diagram of a video conversion apparatus in the present disclosure, and FIG. 3 is a structure diagram of a video conversion system in the present disclosure. As illustrated in FIGS. 2-3, the video conversion apparatus 10 comprises a video input controller 102, a buffer 104, a main controller 101, and a video output controller 103. Specifically, the video input controller 102 is configured to establish a data connection with the video source 20, and the video output controller 103 is configured to establish a data connection with the intelligent terminal 30.

The main controller 101 is configured to control the video input controller 102 to acquire a video stream transmitted from the video source 20; control the video input controller 102 to perform a format conversion operation on the video stream in a preset video display format, and store the converted video stream in the buffer 104; and control the video output controller 103 to output the converted video stream in the buffer 104 to the intelligent terminal 30 which displays the converted video stream.

The video input controller 102 in the video conversion apparatus 10 serves as a video input end to be connected with the video source 20, so as to receive the video stream transmitted by the video source 20. In a specific embodiment of the present disclosure, the video source 20 is a terminal device capable of running virtual reality applications, and specifically may be a terminal device of high-performance such as personal computer, notebook computer, game console, etc.

The video output controller 103 in the video conversion apparatus 10 serves as a video output end to be connected with the intelligent terminal 30. The video conversion apparatus 10 converts the video stream obtained by running a virtual reality application on the video source 20, and outputs to the intelligent terminal 30. In a specific embodiment of the present disclosure, the intelligent terminal 30 includes small-scale intelligent devices, such as the intelligent phone and intelligent tablet, whose power consumption is insufficient to run a high-quality virtual reality application.

It can be seen that the video input end of the video conversion apparatus 10 provided by the present disclosure is connected to the terminal device such as the game console, so as to receive the video stream output after running a virtual reality application on the game console; a format conversion operation is performed on the received video stream in a preset video display format; and the converted video stream is stored in the buffer 104. In the output process, under the control of the controller 101, the video output controller 103 outputs the converted video stream in the buffer 104 to the intelligent terminal 30 which displays the converted video stream.

The visual effect achieved by running a virtual reality application on the high-performance terminal device is much better than running the same on the intelligent terminal such as a cellular phone, thus the video source 20 is obtained by running the high-quality virtual reality application on the high-performance terminal device. While the intelligent terminal 30 is responsible for displaying and providing certain motion data, which means providing angular velocity motion parameters or acceleration motion parameters according to the gyroscope, acceleration sensor, etc. in the intelligent terminal, so that in the process of displaying the virtual reality application on the intelligent terminal, the displayed image can be adjusted according to the provided motion parameters.

Thus, the user can experience a high-quality virtual reality application on the intelligent terminal like a cellular phone without buying expensive equipment such as the virtual reality helmet, when a virtual reality application is to be displayed on the intelligent terminal 30. The apparatus provided by the present disclosure solves the problem that the existed intelligent terminal 30 does not have the performance of running a high-quality virtual reality application due to the limitations of volume and power consumption, and largely extends the usage range of the virtual reality device based on the intelligent terminal 30.

In the present disclosure, the data connection between the video conversion apparatus 10 and the video source 20 may be either a wired connection or a wireless connection.

In a specific embodiment of the present disclosure, the video input controller 102 establishes a data connection with the video source 20 through a wired interface. Specifically, a wired connection with the video source is established through a High Definition Multimedia Interface (HDMI) data line, or a Video Graphics Array (VGA) data line, or a Digital Visual Interface (DVI) database, or a DisplayPort data line, or a Mobile High-Definition Link (MHL) video line.

In a specific embodiment of the present disclosure, the video input controller 102 may use a TI THS8200 chip which converts a VGA signal into an RGB signal and outputs it, or a TI TFP401 chip which converts an HDMI signal into an RGB signal and outputs it. The main controller 101 may be any MCU, and specifically stm32. The video output controller 103 may be GL3620 of Skyworth.

In a specific embodiment of the present disclosure, the video input controller 102 establishes a data connection with the video source 20 through a wireless interface. Specifically, the video input controller is configured to establish a wireless connection with the video source through a Wireless Home Digital Interface (WHDI) wireless connection mode, or a Wireless Gigabit (WiGig) wireless connection mode, or a Wireless Display (WIDI) wireless connection mode.

In one embodiment of the present disclosure, the video input controller 102 is specifically a module supporting the standard video transmission protocol, which can acquire a video stream from the video source device when establishing a connection with the game console or other video source device. Specifically, after the video input controller 102 establishes a data connection with the video source 20, the video source 20 identifies the video input controller as a standard video output device and transmits the video stream thereto. After receiving the data of the video stream, the video input controller 102 decodes according to an adopted transmission specification, and stores the decoded image data into a buffer module.

In which, the video input controller 102 decodes according to an adopted transmission specification means decoding according to a transmission specification of the specific connection mode between the video input controller 102 and the video source 20. For example, when the video input controller 102 and the video source 20 are connected to each other through an HDMI interface, the video input controller 102 decodes the received video stream according to an HDMI specification.

In one embodiment of the present disclosure, the video output controller 103 is specifically a video output controller supporting a USB Video Class (UVC), which can transmit a video stream to the intelligent terminal when establishing a connection therewith. Specifically, the video output controller 103 extracts the converted video stream from the buffer 104, and transmits the converted video stream to the intelligent terminal according to the UVC. In which, the video output controller 103 is identified as a USB video collector by the intelligent terminal. That is, after receiving the video stream transmitted from the video output controller 103, the intelligent terminal 30 can identify the video output controller 103 as a USB camera, and identify the video stream transmitted as graphics collected by the USB camera. Thus, displaying the converted video stream by the intelligent terminal is specifically to play the converted video stream through an application installed on the intelligent terminal. That is, it only needs to install an application supporting a camera preview on the intelligent terminal 30 for displaying.

In the above embodiment of the present disclosure, the interface of the video output controller 103 may be a USB interface, or any interface supported by other intelligent phone.

Referring to FIG. 3, the present disclosure discloses a video conversion system, comprising: a video source, an intelligent terminal and a video conversion apparatus as illustrated in FIG. 1. Next, the working principle of the video conversion system in the present application will be described in details in conjunction with FIG. 2 and specific embodiments.

Firstly, a data connection is established, i.e., the video input end of the video conversion apparatus 10 establishes a data connection with the video source 20, and the video output end of the video conversion apparatus 10 establishes a data connection with the intelligent terminal 30.

The video source comprises a terminal device for running a virtual reality (VR) application.

In a specific embodiment of the present disclosure, the video input end of the video conversion apparatus 10 establishes a wired connection with the video source through an HDMI data line, or a VGA data line, or a DVI database, or a DisplayPort data line, or an MHL video line.

In another embodiment of the present disclosure, the video input end of the video conversion apparatus 10 establishes a wireless connection with the video source through a WHDI wireless connection, or a WiGig wireless connection, or a WIDI wireless connection.

After establishing the data connection with the video source 20, the video conversion apparatus 10 is identified as a standard display device by the video source 20. After establishing the data connection with the intelligent terminal 30, the video conversion apparatus 10 is identified as an external graphic device by the intelligent terminal 30. In a specific embodiment of the present disclosure, the video conversion apparatus 10 may be identified as a USB camera.

The video conversion apparatus 10 acquires a video stream transmitted from the video source 20, performs a format conversion operation on the video stream in a preset video display format, stores the converted video stream in the buffer 104, and outputs the converted video stream in the buffer 104 to the intelligent terminal 30 which displays the converted video stream.

It can be seen that through the video conversion apparatus 10 provided by the present disclosure, a cellular phone supporting an external graphic device can provide a better virtual reality experience using a high-performance terminal device such as PC or game console, while serving as the virtual reality device, and then obtain a better visual effect, thereby solving the defect that the existed intelligent terminal cannot run a high-quality virtual reality application well due to the limitation of performance.

In addition, in the video conversion apparatus provided by the present disclosure, it is unnecessary to modify the hardware device of the cellular phone, which saves the expensive cost for buying the virtual reality helmet. Moreover, the video output controller 103 can support the standard UVC device, which solves the compatibility with the intelligent terminal. Further, the video input controller 103 provided in the video conversion apparatus can achieve a transmission of higher resolution and a lower delay as compared with the existed data transmission mode such as Wifi or BLUETOOTH® module, thus it brings better user experiences.

Figure 4:
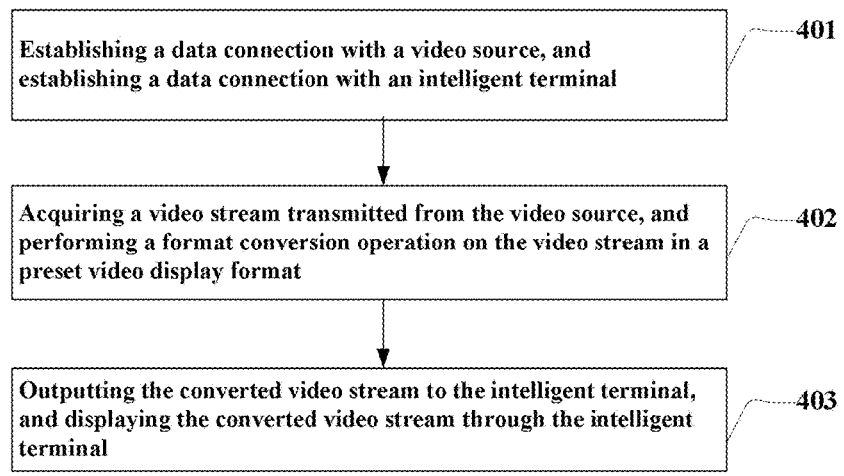
FIG. 4 is a flow diagram of a video conversion method in the present disclosure.

FIG. 4 is a flow diagram of a video conversion method in the present disclosure. Referring to FIG. 4, the method comprises:

step 401: establishing a data connection with a video source, and establishing a data connection with an intelligent terminal;

step 402: acquiring a video stream transmitted from the video source, and performing a format conversion operation on the video stream in a preset video display format;

step 403: outputting the converted video stream to the intelligent terminal, and displaying the converted video stream through the intelligent terminal.

In a preferred embodiment of the present disclosure, a buffer for buffering the video stream is further comprised. Thus in step 402, after the format conversion operation is performed on the video stream, the converted video stream is stored in the buffer.

Further, in step 403, the converted video stream in the buffer is output to the intelligent terminal.

In a specific embodiment of the present disclosure, the video source comprises a terminal device for running a virtual reality application.

establishing a data connection with the video source comprises: establishing a wired connection with the video source, or establishing a wireless connection with the video source.

In which, establishing a wired connection with the video source comprises:

establishing a wired connection with the video source through an HDMI data line, or a VGA data line, or a DVI database, or a DisplayPort data line, or a MHL video line.

Or, establishing a wireless connection with the video source comprises: establishing a wireless connection with the video source through a WHDI wireless connection mode, or a WiGig wireless connection mode, or a WIDI wireless connection mode.

In a specific embodiment of the present disclosure, acquiring a video stream transmitted from the video source, and performing a format conversion operation on the video stream in a preset video display format comprises:

after establishing a data connection with the video source, the video conversion apparatus is identified as a video output module by the video source; acquiring a video stream transmitted from the video source, and performing a format conversion operation on the video stream in a video display format corresponding to the data connection mode.

In a specific embodiment of the present disclosure, establishing a data connection with an intelligent terminal comprises: establishing a data connection with the intelligent terminal through a video output controller supporting a UVC;

Extracting the converted video stream from the buffer by the video output controller, and transmitting the converted video stream to the intelligent terminal according to the UVC;

wherein, the video output controller is identified as a USB video collector by the intelligent terminal.

In a specific embodiment of the present disclosure, the intelligent terminal comprises the intelligent phone and intelligent tablet;

wherein, displaying the converted video stream through the intelligent terminal comprises: playing the converted video stream through an application installed on the intelligent terminal.

It can be seen that in the technical solutions provided by the present disclosure, a high-quality virtual reality application is run as a video source by a high-performance terminal device; the intelligent terminal is responsible for displaying and providing certain motion data. Thus the user can experience a high-quality virtual reality application on the intelligent terminal like a cellular phone without buying expensive equipment such as the virtual reality helmet, when a virtual reality application is to be displayed on the intelligent terminal, thereby solving the problem that the existed intelligent terminal does not have the performance of running a high-quality virtual reality application due to the limitations of volume and power consumption. By adopting the technical solutions provided by the present disclosure, a cellular phone supporting an external graphic device can provide a better virtual reality experience using a high-performance terminal device such as PC or game console, while serving as the virtual reality device, and then obtain a better visual effect, thereby solving the defect that the existed intelligent terminal cannot well run a high-quality virtual reality application due to the limitation of performance. Further, the video input controller provided in the video conversion apparatus can achieve a transmission of higher resolution and a lower delay as compared with the existed data transmission mode such as Wifi or BLUETOOTH® module, thus it brings better user experiences.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A video conversion apparatus comprising a video input controller, a main controller, and a video output controller;
   wherein the video input controller is configured to establish a data connection with a video source including a terminal device for running a virtual reality application;
   wherein the video output controller is configured to establish a data connection with an intelligent terminal;
   wherein the main controller is configured to control the video input controller to acquire a video stream for the virtual reality application transmitted from the video source after running the virtual reality application on the video source, control the video input controller to perform a format conversion operation on the video stream for the virtual reality application in a preset video display format, and control the video output controller to output a converted video stream to the intelligent terminal which displays the converted video stream by playing the converted video stream through a virtual reality application installed on the intelligent terminal;
   wherein the intelligent terminal is responsible for displaying and providing motion data, so that when the virtual reality application is displayed on the intelligent terminal, the displayed image is adjustable according to the motion data; and
   wherein the video conversion apparatus is identified as a standard display device by the video source after establishing the data connection with the video source, and as an external graphic device by the intelligent terminal after establishing the data connection with the intelligent terminal.

2. The video conversion apparatus according to claim 1, wherein:
   the video input controller is configured to establish a wired connection with the video source through a High Definition Multimedia Interface (HDMI) data line, a Video Graphics Array (VGA) data line, a Digital Visual Interface (DVI) database, a DisplayPort data line, or a Mobile High-Definition Link (MHL) video line; or
   the video input controller is configured to establish a wireless connection with the video source through a Wireless Home Digital Interface (WHDI) wireless connection mode, a Wireless Gigabit (WiGig) wireless connection mode, or a Wireless Display (WIDI) wireless connection mode.

3. The video conversion apparatus according to claim 2, wherein the intelligent terminal comprises at least one of an intelligent phone and an intelligent tablet.

4. The video conversion apparatus according to claim 2, further comprising a buffer, wherein the main controller is configured to store the converted video stream in the buffer, and control the video output controller to output the converted video stream in the buffer to the intelligent terminal which displays the converted video stream.

5. A video conversion system, comprising a video source, an intelligent terminal, and the video conversion apparatus according to claim 1;
   wherein a video input end of the video conversion apparatus establishes a data connection with the video source;
   wherein a video output end of the video conversion apparatus establishes a data connection with the intelligent terminal; and
   wherein the video conversion apparatus is configured to acquire a video stream transmitted from the video source, perform a format conversion operation on the video stream in a preset video display format, and output a converted video stream to the intelligent terminal which displays the converted video stream.

6. The video conversion system according to claim 5, wherein the video source comprises a terminal device for running a virtual reality application; and
   wherein the video input end of the video conversion apparatus is configured to establish a wired connection with the video source through a High Definition Multimedia Interface (HDMI) data line, a Video Graphics Array (VGA) data line, a Digital Visual Interface (DVI) database, a DisplayPort data line, or a Mobile High-Definition Link (MHL) video line, or the video input end of the video conversion apparatus is configured to establish a wireless connection with the video source through a Wireless Home Digital Interface (WHDI) wireless connection mode, a Wireless Gigabit (WiGig) wireless connection mode, or a Wireless Display (WIDI) wireless connection mode.

7. The video conversion system according to claim 6, wherein the intelligent terminal comprises at least one of an intelligent terminal and an intelligent tablet; and
   wherein displaying the converted video stream by the intelligent terminal comprises playing the converted video stream through a virtual reality application installed on the intelligent terminal.

8. The video conversion system according to claim 5, wherein the video conversion apparatus further comprises a buffer; and wherein the video conversion apparatus is configured to store the converted video stream in the buffer, and output the converted video stream in the buffer to the intelligent terminal which displays the converted video stream.

9. A video conversion method comprising:
   establishing a data connection with a video source including a terminal device for running a virtual reality application;
   establishing a data connection with an intelligent terminal;
   acquiring a video stream for the virtual reality application transmitted from the video source after running the virtual reality application on the video source, and performing a format conversion operation on the video stream for the virtual reality application in a preset video display format;
   outputting a converted video stream to the intelligent terminal; and
   displaying the converted video stream with the intelligent terminal by playing the converted video stream through a virtual reality application installed on the intelligent terminal, wherein the intelligent terminal is responsible for displaying and providing motion data, so that when the virtual reality application is displayed on the intelligent terminal, the displayed image is adjustable according to the motion data; and wherein a video conversion apparatus is identified as a standard display device by the video source after establishing the data connection with the video source, and as an external graphic device by the intelligent terminal after establishing the data connection with the intelligent terminal.

10. The method according to claim 9, wherein establishing the data connection with the video source comprises:
    establishing a wired connection with the video source through a High Definition Multimedia Interface (HDMI) data line, a Video Graphics Array (VGA) data line, a Digital Visual Interface (DVI) database, a DisplayPort data line, or a Mobile High-Definition Link (MHL) video line, or establishing a wireless connection with the video source through a Wireless Home Digital Interface (WHDI) wireless connection mode, a Wireless Gigabit (WiGig) wireless connection mode, or a Wireless Display (WIDI) wireless connection mode.

\* \* \* \* \*